United States Patent
Propst et al.

[11] 3,768,116
[45] Oct. 30, 1973

[54] SHOCK MOUNT FOR CASTER SOCKETS

[75] Inventors: Robert L. Propst, Ann Arbor; James O. Kelley, Spring Lake, Mich.

[73] Assignee: Herman Miller, Inc., Zeeland, Mich.

[22] Filed: July 26, 1971

[21] Appl. No.: 166,131

[52] U.S. Cl. ................................................. 16/43
[51] Int. Cl. .......................................... A47b 91/00
[58] Field of Search ...................... 16/43, 38, 39, 2; 248/19, 20; 85/50, 1

[56] References Cited
UNITED STATES PATENTS
3,038,194   6/1962   Arenson.................................. 16/43
3,210,795   10/1965   Fontana et al.......................... 16/43

Primary Examiner—James T. McCall
Assistant Examiner—Doris L. Troutman
Attorney—Price, Heneveld et al.

[57] ABSTRACT

A rubber insulating sleeve is positioned between the caster socket insert and mounting socket walls. The sleeve provides a non-rigid assembly for damping the transmission of acoustical vibrations between the caster and caster supported body. The sleeve has a lower flange with a washer embedded therein which overides the lower portion of the socket insert to prevent the insert and sleeve from being undesirably drawn up into the socket opening.

8 Claims, 5 Drawing Figures

PATENTED OCT 30 1973　　3,768,116
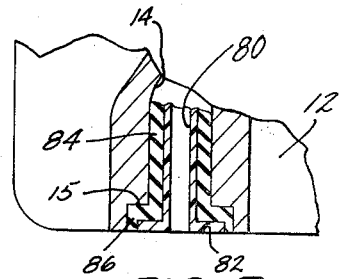
FIG. 5.
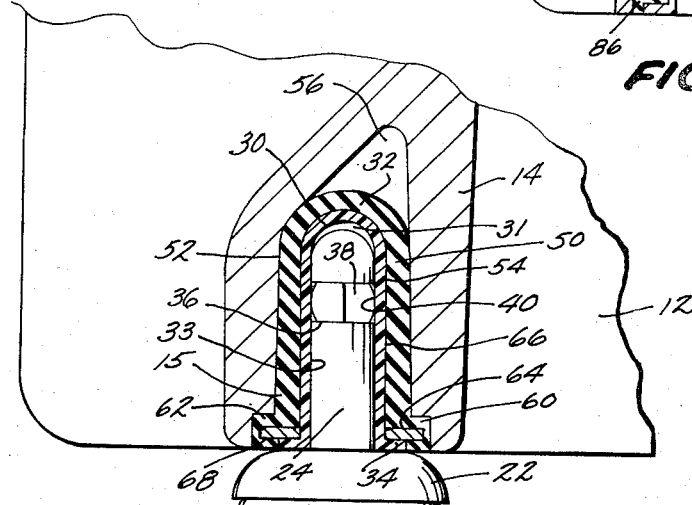
FIG. 1.
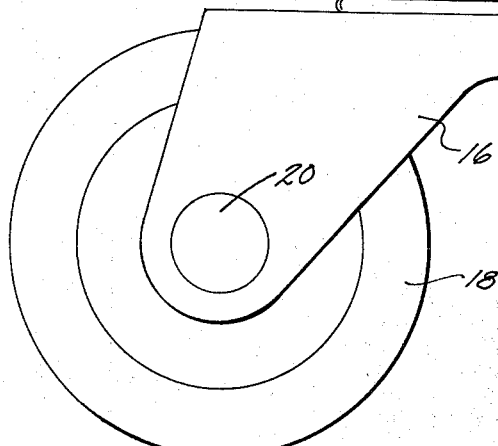
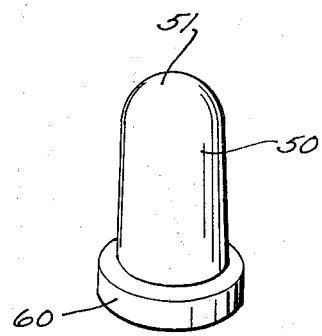
FIG. 2.
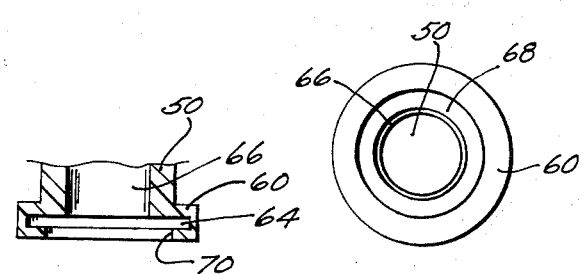
FIG. 3.　　FIG. 4.
INVENTORS
ROBERT L. PROPST
JAMES O. KELLY
BY
ATTORNEYS

SHOCK MOUNT FOR CASTER SOCKETS

BACKGROUND OF INVENTION

This invention relates to caster mountings for various objects which are adapted to be moved across a floor or other support and is particularly useful in connection with material handling trucks although it is equally applicable to machines which generate their own vibrations due to the action of movable parts mounted upon the supporting frame of the machine.

Conventional hand trucks utilizing casters are quite noisy as a result of the acoustical coupling between the caster and the leg of the truck. As the truck is propelled along the floor or other support surface, one or more of the casters will generally begin vibrating as a result of the unevenness of the floor or other causes such as resonent characteristics. When this happens, the truck body due to its physical coupling with the caster acts as an acoustical drum and magnifies the vibrations to an undesirable level. In other applications, such as washing machines, dryers, etc., wherein the operation of the machine itself sets up vibrations incidental to that operation as a result of moving parts within the machine, objectionable noise is transmitted from the moving parts through the main supporting frame, through the legs to the casters resulting in more or less irregular motion of the casters along and upon the floor.

Present proposals have failed to eliminate or reduce acoustical vibrations to an acceptable level. It has been suggested to provide rubber or rubber-like materials between the leg gripping floor contacting parts of the caster. However, proposals to date have been inadequate in coping with the high loads generated on the caster. These loads have resulted in the rubber either being pulled loose from the leg, or in some cases sheared. Others have caused the rubber to become distorted and pulled up into the caster socket thereby destroying its intended effect. In addition, the socket inert tends to be pushed up into the socket too far since the socket is enlarged to compensate for the use of the rubber sleeve. Thus, there is a need for an effective acoustical damper on a caster assembly which prevents the transmission of acoustical vibrations between the caster mounting and the caster supported body. In addition, there is a need for a simple, inexpensive damper which will withstand a wide variety of loading stresses.

SUMMARY OF INVENTION

The acoustical damping resilient sleeve of this invention includes an annular flange at the lower end thereof having a rigid annular insert embedded therein. The flange has an outer diameter which is greater than the inner diameter of the caster socket into which it is to be inserted. In this manner, when a socket insert, for receiving a pintle, is inserted into the sleeve, the annular flange of the sleeve with its rigid insert, will prevent the sleeve from being drawn upwardly into the caster socket.

Socket inserts usually have flanges themselves at their lower ends to act as a bearing surface for the caster raceway. It is another object of the present invention to provide a rigid annular insert for the sleeve flange with an inner diameter which is greater than the outer diameter of the socket insert flange. This prevents the socket insert from being jammed up into the caster socket which has been enlarged to accommodate the accoustical damping sleeve.

In another aspect of the invention, the tubular sleeve is closed at its top, thus completely encapsulating the sides and top of the socket insert. This further deadens vibrations through the socket insert and insures that contact between the top of the socket insert and the socket will be avoided.

These and other objects and advantages will be appreciated from a consideration of two embodiments of the invention which will now be described in detail.

DESCRIPTION OF THE DRAWINGS

FIG. 1 is an elevation view showing the overall caster mounting assembly embodying the present invention, a portion of which is in cross section;

FIG. 2 is a perspective view of the caster sleeve porposed by this invention;

FIG. 3 is a cross section view of the bottom portion of the caster sleeve with the washer removed;

FIG. 4 shows a bottom plan view of the caster sleeve with the washer in place; and FIG. 5 is a view similar to FIG. 3 showing an alternative embodiment wherein the insert flange acts as the washer.

DESCRIPTION OF THE PREFERRED EMBODIMENT

Referring to FIG. 1, a flexible, tubular sound deadening sleeve 50 is mounted within a caster socket 14 of a truck leg 12. A socket insert 30 of caster assembly 10 is mounted in sleeve 50 for receiving pintle 24 of caster assembly 10. Sleeve 50 includes an annular flange 62 having a washer 68 embedded therein to prevent sleeve 50 from being jammed up into socket 14 and to prevent insert 30 from being forced too far into socket 14 which is enlarged to receive the sleeve.

Referring now to the drawings in detail, FIG. 1 shows a caster assembly 10 mounted on a leg 12 of a hand truck (not shown) or the like, leg 12 having a socket 14 and opening 15 for receipt of the upper portion of the caster assembly. The caster assembly 10 includes a mounting bracket 16 with a wheel or tire 18 and an axle 20 mounted thereto. A roller bearing-raceway assembly 22 permits swivel movement of the bracket and wheel relative to the caster pintle 24. The bracket, wheel, raceway assembly and pintle are all conventional and hence not described in detail.

A socket-mounting insert 30 is positioned within the socket 14 and includes a recess 31 adapted to receive and lock the pintle 24 to leg 12. The mounting socket 30 has an overall cylindrical shape with a closed upper end 32 and a flange portion 34 on the lower end. The flange portion 34 increases the bearing area between the insert and upper portion of the raceway assembly 22. This reduces undesirable stress concentrations.

Conventionally, mounting socket 30 is rigid and is press-fitted into socket 14 to fit tightly therein. The pintle 24 is then inserted into mounting socket recess 31 for a tight frictional engagement with recess walls 33 to lock the caster to the truck body. The pintle includes an annular cut out portion 36 having a reduced cross section in which is seated an expandable lock washer 38 whose outside periphery 40 is biased to extend slightly beyond the outer periphery of the pintle. Thus, when pintle 24 is inserted into socket insert 30, expandable lock washer 38 is compressed tightly inward to provide a tight friction engagement with the interior surface of the socket mounting insert to lock the pintle and caster within the insert. As discussed earlier, a conventional mounting is generally rigid and directly transmitts acoustical vibrations between the truck body and caster assembly. That is, conventionally socket insert 30 is pressure fitted against the socket walls. Thus, when noise is generated by vibrations on physical movement, the sound is transmitted directly through the caster mount on joint assembly.

According to this invention, the cross sectional dimension of socket 14 is enlarged so that insert 30 is spaced from the socket walls by a sound insulating sleeve 50 which is inserted into the socket intermediate the interior surface 52 of the socket and the exterior surface 54 of socket mounting insert 30. Preferably, sleeve 50 is comprised of a flexible material such as rubber or the like which does not transmit sound and provides some give in assembly 10 so that it is not rigid.

One form of sleeve 50 (shown in FIG. 2) is an overall thimble-shaped configuration having a closed top 51 such that the entire portion of the mounting socket insert and the pintle 24 are completely insulated from physically contacting the walls of socket 14. This by itself greatly reduces or deadens the transmission of acoustical vibrations between the truck socket and caster assembly. A more effective damping is achieved however as a result of the resilient and flexible characteristics of the sleeve. As a result of the resonant vibrational tendencies in caster assemblies, even where the pintle and mounting insert are somewhat insulated from the truck socket, if the assembly is rigid, objectionable noise vibrations may still be transmitted to the truck body which acts as an acoustical drum. The yieldable characteristics however of a totally encapsulating rubber sleeve acts as an effective acoustical shock absorbing means. Thus, there is not a rigid interlock between caster assembly 10 and leg 12 of the truck body.

In general, the overall cross sectional configuration of the truck socket 14, sleeve insert 50, socket mounting insert 30, and pintle 24 is tubular, and preferably, cylindrical. Socket 14 shown in FIG. 1 is noted to be slightly irregular in that it has a non-uniform recess portion 56 above the projection of the caster mounting assembly. This is in no way intended to be a limitation on the socket design since the exact physical configurations will vary depending on the method of formation. The socket shown in FIG. 1 is molded, and recess 56 is to facilitate withdrawal of the dies. However, it does create a need for properly indexing the sleeve and insert within the socket so that they are not inserted too far up into recess 56 so that raceway 22 comes into direct contact with the socket walls. Generally, the overall interior configuration of the socket will match that of the caster assembly inserted.

It will be appreciated that the diameter of opening 15 is preferably less than the diameter of sleeve 50 when it is free of the socket as shown in FIG. 2. The reason for this is that when the caster assembly is mounted within the socket 14, it is desirable that there be sufficient frictional engagement between the various elements of the assembly so that if the truck or cart be lifted from a support surface such as floor, the caster assembly will not drop out of the mounting socket. Hence, the diameter of socket opening 15 is such that when the caster mounting assembly 10 is inserted therein, rubber sleeve 50 will be compressed from its normal expanded state so that a tight wedge fitting between the walls of opening 15, sleeve 50 and insert 30 is provided.

To index sleeve 50 and socket insert 30 within opening 15, sleeve 50 includes a flanged portion 60 at its lower end, the outer diameter of which exceeds that of socket opening 15. In the preferred embodiment, socket 14 includes an enlarged recess 62 at its mouth for receipt of flange 60. It has been found that when caster mounting assembly 10 is inserted into socket opening 15 and sleeve 50 is compressed between the walls of opening 15 and socket insert 30, the sleeve has a tendency to travel up into the socket and become distorted and reduced in length. This tendency is especially noted when the loading is high. The displacement or distortion of the sleeve disrupts the insulation of the pintle and socket mounting from the truck body and reduces the sleeves effectiveness as a damper. The flanged portion 60 reduces this tendency since it extends radially beyond the interior wall 52 of socket 14 which thereby acts as a barrier to sleeve flange 60 being drawn up into the socket.

To completely insure sleeve 50 from becoming distorted up into socket 14, an annular recess 64 (FIG. 3) is formed in sleeve flange 60 with the outside diameter of recess 64 extending radially beyond opening 15. I.e., the diameter of opening 15 is less than the diameter of recess 64. A rigid washer 68 (preferably metallic) is embedded in recess 64 and physically prevents flange portion 60 of sleeve 50 from being drawn up into socket opening 15 since the washer is rigid and non-deformable in contrast to the sleeve. At the same time complete insulation is achieved since although washer 68 may come into contact with insert 30, the washer is insulated by sleeve flange 60 from physically contacting the walls of opening 15. In addition, sleeve flange 60 and washer 68 physically prevent insert 30 from being drawn up into socket 14 too far since washer 68 rests over insert flange 34. Thus, washer 68 indexes both sleeve 50 and insert 30 longitudinally within socket 14.

With reference to FIGS. 1 and 3, the cross sectional diameter of opening 70 in flange 60 is shown to exceed that of the main opening 66 of sleeve 50. Preferably, opening 70 corresponds to the cross sectional diameter of flange 34 on socket insert 30. This permits flange 34 to seat in opening 70 and also permits easier installation of washer 68 within flange 60.

FIG. 4 shows a bottom plan view of sleeve 60 with washer 68 inserted therein. In the preferred form, the interior diameter of washer 68 is greater than the diameter of opening 66 of sleeve 50 so that the inside walls of sleeve 50 projects over washer 68 to the inside. This insures that there will be a tight fit between the inside walls of sleeve 50 and the outer walls 54 of socket mounting 30.

Referring to FIG. 5, an alternative embodiment of my invention is shown wherein a socket insert 80 is shown to be similar to socket insert 30 except that the diameter of flange 82 is extended so that it exceeds that of socket oepning 15. In this form, flange 82 replaces the function of washer 68 since it prevents insert 80 from being drawn too far into socket 14 and also acts to prevent sleeve 84 from being squeezed up into the socket 14 since insert flange 82 bears on sleeve flange 86. The configuration of flange 86 is altered slightly to accomodate insert flange 82 as shown.

As a result of the foregoing, this invention provides a simple and inexpensive rubber sleeve which completely encapsulates that portion of a caster assembly which is inserted into the mounting socket on a movable hand truck or other body. This completely insulates the caster assembly from the body to damp out undesired acoustical vibrations transmitted between the truck body and caster assembly. Also, due to the nature of rubber or similar material, the sleeve resiliently yields to shocks projected from the caster assembly as the body is moved across uneven surfaces. This yielding tendency acts as an acoustical shock absorber to further damp acoustical vibrations. The same effect is achieved whether in the alternative the body itself is a machine having vibratory elements operating within itself. The sleeve cushions and damps these vibrations from being transmitted across to the caster assembly. The washer element embedded in the flange portion of the sleeve prevents the sleeve from becoming distorted up into the socket itself.

In addition, sleeve 50 reduces the need for exact tolerencing of the socket as it relates to socket insert 30 as required in present proposals. Since insert 30 is secured in socket 14 as a result of sleeve 50 being squeezed tightly between the socket walls and the insert, the need for exact tolerencing is eliminated. As a result, additional economies are realized.

Although two embodiments have been shown and described in detail, it will be obvious to those having ordinary skill in this art that the details of construction in these particular embodiments may be modified in a great many ways without departing from the concepts presented. It is therefore intended that the invention is limited only by the scope of the intended claims rather than by particular details of construction shown, except as specifically stated in the claims.

We claim:

1. A caster mounting assembly comprising, in combination: a socket insert having a tubular shape to permit insertion of the stem of a caster for anchoring therein, said insert having a flange at its lower end to provide bearing contact with said caster, a flexible tubular shaped sleeve adapted to receive said insert therein, said sleeve having a flange portion at its lower end, said assembly being positionable in a mounting socket, the diameter of said sleeve flange exceeding the diameter of the mounting socket, and rigid means positioned intermediate said sleeve flange and insert flange, said rigid means having an inner and outer diameter, the outer diameter exceeding that of the mounting socket and the inner diameter being less than the diameter of said insert flange so that when said assembly is mounted in said mounting socket, said rigid means physically prevents said sleeve and insert flanges from being drawn up into said socket opening.

2. The caster mounting assembly according to claim 1 wherein said sleeve flange includes an annular interior recess for receipt of said rigid means.

3. A caster mounting assembly according to claim 2 wherein said rigid means comprises an annular washer seated within said recess.

4. A caster mounting assembly according to claim 1 wherein the outer diameter of said socket insert flange is greater than the diameter of said socket opening to prevent said sleeve flange and insert flange from being drawn up into said socket opening, said socket insert flange comprising said rigid means.

5. In a caster mounting assembly having a mounting socket, a socket insert secured in said socket, said insert having a tubular shape to permit insertion of the stem of a caster for anchoring therein, said insert including a flange at its lower end to provide bearing contact with said caster, the improvement comprising: a resilient tubular shaped sleeve mounted within said socket intermediate the socket walls and said insert, said sleeve being comprised of a flexible acoustical damping material to prevent the transmission of acoustical vibrations between the socket walls and caster mount, said sleeve including a flange portion at its lower end having an annular and interior recess, said flange having a diameter greater than the diameter of said socket opening; and a rigid annular washer seated within said recess, the outer diameter of said washer being greater than the diameter of said socket opening and the inner diameter of said washer being less than the diameter of said insert flange so that when said assembly is mounted in said socket, said washer physically prevents said sleeve flange and insert flange from being drawn up into said socket opening.

6. In a caster mounting assembly having a mounting socket, a socket insert secured within said socket, said insert having a tubular shape to permit insertion of the stem of a caster for anchoring therein, the improvement comprising a resilient tubular shaped sleeve having sound insulating properties, said sleeve mounted within said socket intermediate the walls of said socket and said socket insert, said sleeve having a flange portion at its lower end, the diameter of said sleeve flange being greater than the diameter of said socket opening, said sleeve flange including an annular and interior recess, said sleeve having a closed top so that said socket insert and said caster are completely insulated from physically contacting said socket wall to prevent the transmission of acoustical vibrations between said socket and said socket insert, said socket insert including a flange portion at its lower end, and a metal washer seated in said recess, the outer diameter of said washer being greater than the diameter of said socket opening and the inner diameter being less than the diameter of said insert flange so that the walls of said socket physically prevent said washer, sleeve flange and insert flange from being drawn up into said socket opening.

7. A caster mount according to claim 6 wherein said sleeve is generally thimble-shaped and is comprised of a flexible and resilient material such as neoprene or the like.

8. An acoustical damper for preventing the transmission of acoustical vibration between a caster mounting assembly and a caster supported body having a socket for receipt of said mounting assembly, said damper comprising a resilient tubular shaped sleeve having a closed top and a lower flanged portion, said flange portion including an annular and interior recess, said sleeve being comprised of an acoustical damping material and dimensioned such that it can be mounted within said socket intermediate the walls of said socket and said caster assembly, said sleeve flange having a diameter greater than said socket opening; said caster mounting assembly including a socket insert positioned in said sleeve, said insert including a flange at its lower end; and a metal washer disposed within said recess, said washer having an opening to permit said caster assembly to be inserted therethrough, said washer having an outer diameter greater than the diameter of said socket opening and an inner diameter less than the diameter of said insert flange to prevent said washer, sleeve flange and insert flange from being drawn up into said socket opening.

* * * * *